United States Patent Office 3,415,833
Patented Dec. 10, 1968

3,415,833
PYRIDYL-DICARBOXYLIC ACID CYCLOBUTANE DERIVATIVES
Eric T. Fossel, New Haven, Conn., assignor to Unimed, Inc., Morristown, N.J.
No Drawing. Continuation-in-part of application Ser. No. 360,446, Apr. 16, 1964. This application Feb. 7, 1966, Ser. No. 525,322
10 Claims. (Cl. 260—295)

ABSTRACT OF THE DISCLOSURE

The invention relates to new pyridyl-dicarboxylic acid-cyclobutane derivatives such as 1-(2'-pyridyl)-2,3-dicarboxylic acid cyclobutane, and to the production of these compounds, which compounds have the effect of rapidly and markedly causing a rise in blood pressure.

---

This application is a continuation-in-part of my copending application Ser. No. 360,446, filed Apr. 16, 1964, now abandoned, for "Pyridyl-Dicarboxylic Acid Cyclobutane Derivatives."

It is an object of the present invention to provide a new series of compounds of the above type.

It is another object of the present invention to provide a method of producing these new compounds.

It is also another object of the present invention to provide a method of producing these new compounds.

It is still another object of the present invention to provide new compounds of the above type which have a highly effective action in giving rise to a pronounced increase in blood pressure so that these compounds can be used in the treatment of shock and the like.

Other objects and advantages of the present invention will be apparent from a further reading of the specification and of the appended claims.

With the above and other objects in view, the present invention mainly comprises a compound selected from the group consisting of compounds of the formula:

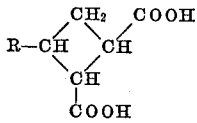

wherein R is a pyridyl ring linked to the cyclobutane ring at the 2-position or the 4-position, and physiologically compatible acid addition salts and esters thereof.

The base compounds of the present invention are 1-(2'-pyridyl)-2,3-trans dicarboxylic acid cyclobutane; 1-(4'-pyridyl)-2,3-trans dicarboxylic acid cyclobutane; 1-(2'-pyridyl)-2,3-cis dicarboxylic acid cyclobutane; and 1-(4'-pyridyl)-2,3-cis dicarboxylic acid cyclobutane. The most preferred acid addition salt is the hydrochloride, although other acid addition salts such as sulfate, fumarate, succinate, etc. are also suitable. The esters include the lower alkyl esters such as methyl ester, ethyl ester, etc., as well as other physiologically compatible esters.

The compound 1-(2'-pyridyl)-2,3-trans dicarboxylic acid cyclobutane has the following structural formula:

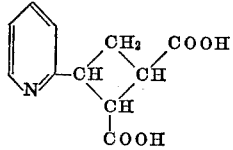

The 4'-pyridyl derivative has the same structure except that the cyclobutane ring is linked to the 4-position of the pyridyl ring.

The compounds of the present invention have the property of causing a rapid and marked rise in blood pressure, as determined by injection of the compounds into animals which were previously subjected to Nembutal anethesia. This rapid and marked rise in blood pressure permits the use of the compounds in the treatment of shock and the like.

The trans compounds of the present invention can be formed by condensing the 2-vinyl pyridine or 4-vinyl pyridine with fumaric acid. The cis compounds can be formed by condensing the 2-vinyl pyridine or 4-vinyl pyridine with maleic acid.

The following examples are given to further illustrate the present invention. The scope of the invention is not, however, meant to be limited to the specific details of the examples:

EXAMPLE 1

1-(2'-pyridyl)-2,3-transdicarboxylic acid cyclobutane:

232 g. (2 moles) of fumaric acid are dissolved in 700 ml. isopropyl alcohol. To effect this the solvent must be heated to a boil. To this solution is added 105 g. of freshly distilled 2-vinyl pyridine. The solution resulting is boiled for 10 minutes. When the boiling is concluded the solution is allowed to cool to room temperature. The 1-(2'-pyridyl)-2,3 trans dicarboxylic acid cyclobutane precipitates out and is collected as white crytsals on a Buchner funnel; yield=99.5% of the theoretical.

Analysis for C, H, and N are well within experimental error.

Decomposition point: M.P. 150°-156°, not sharp, some decomposition.

The hydrogen chloride acid addition salt can be formed by reaction with hydrogen chloride.

EXAMPLE 2

1-(4'-pyridyl)-2,3-trans dicarboxylic acid cyclobutane:

232 g. (2 moles) of fumaric acid are dissolved, by heating a boil, in 1200 cc. isopropyl alcohol. To this solution is added 105 g. of freshly distilled 4-vinyl pyridine. The solution is boiled for 5 minutes and allowed to cool to room temperature. By the time room temperature is achieved all of the cyclobutane derivative is crystallized out and may be collected on a Buchner funnel; yield=99.5% of the theoretical.

Decomposition point: Starts to melt at 172°—completely decomposed by 180° without completely melting.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention and, therefore, such adaptations should and are intended to be comprehended within the meaning and range of equivalence of the following claims.

What is claimed as new and desired to be secured by Letters Patent is:

1. A compound selected from the group consisting of compounds of the formula:

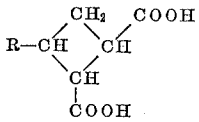

wherein R is a pyridyl ring liked to the cyclobutane ring at a position selected from the group consisting of the 2-position and the 4-position, and physiologically compatible acid addition salts and esters thereof.

2. Compound according to claim 1 wherein said compound is 1-(4'-pyridyl)-2,3-trans dicarboxylic acid cyclobutane.

3. Compound according to claim 1 wherein said compound is 1-(2'-pyridyl)-2,3-cis dicarboxylic acid cyclobutane.

4. Compound according to claim 1 wherein said compound is 1-(4'-pyridyl)-2,3-transdicarboxylic acid cyclobutane.

5. Compound according to claim 1 wherein said compound is 1-(4'-pyridyl)-2,3-cis dicarboxylic acid cyclobutane.

6. The method which comprises condensing a compound selected from the group consisting of 2-vinyl pyridine and 4-vinyl pyridine with an acid selected from the group consisting of fumaric acid and maleic acid.

7. Method according to claim 6 wherein said acid is fumaric acid.

8. Method according to claim 6 wherein said acid is maleic acid.

9. Method according to claim 6 wherein said compound is 2-vinyl pyridine.

10. Method according to claim 6 wherein said compound is 4-vinyl pyridine.

References Cited

UNITED STATES PATENTS 3,321,484   5/1967   Krimmel _____ 260—295.5

HENRY R. JILES, *Primary Examiner.*

A. L. ROTMAN, *Assistant Examiner.*

U.S. Cl. X.R.

167—65; 260—290